US006840773B2

(12) United States Patent
Anderson et al.

(10) Patent No.: US 6,840,773 B2
(45) Date of Patent: Jan. 11, 2005

(54) DECORATIVE MAGNETIC SHEET AND METHOD FOR DECORATING AN APPLIANCE

(76) Inventors: Jan Anderson, 449 W. S. College St., Yellow Springs, OH (US) 45387; Jason Augenstein, 5000 Hunter Rd., Enon, OH (US) 45323

( * ) Notice: Subject to any disclaimer, the term of this patent is extended or adjusted under 35 U.S.C. 154(b) by 0 days.

(21) Appl. No.: 10/092,780

(22) Filed: Mar. 7, 2002

(65) Prior Publication Data

US 2003/0170594 A1 Sep. 11, 2003

(51) Int. Cl.[7] .................................................. G09B 25/00
(52) U.S. Cl. ............................. 434/73; 434/72; 434/81
(58) Field of Search ............................. 434/72, 73, 74, 434/80, 81, 84, 90, 365, 382, 383; 428/692

(56) References Cited

U.S. PATENT DOCUMENTS

| | | | | |
|---|---|---|---|---|
| 3,294,461 A | | 12/1966 | Barnard et al. | |
| 3,313,065 A | | 4/1967 | Sandin | |
| 3,328,927 A | | 7/1967 | Kates | |
| 3,525,190 A | * | 8/1970 | Saunders | 52/784.15 |
| 3,773,399 A | | 11/1973 | Sulcek | |
| 3,936,107 A | | 2/1976 | Gourdeau et al. | |
| 3,994,079 A | | 11/1976 | Mirman | |
| 4,229,921 A | | 10/1980 | Schell | |
| 4,732,431 A | | 3/1988 | Mason | |
| 4,831,756 A | | 5/1989 | Huang et al. | |
| 4,948,206 A | | 8/1990 | Firzpatrick | |
| 5,158,346 A | | 10/1992 | Marks et al. | |
| 5,282,317 A | * | 2/1994 | Carter et al. | 33/1 B |
| 5,358,326 A | | 10/1994 | Cherry et al. | |
| 5,496,104 A | | 3/1996 | Arnold et al. | |
| 5,549,938 A | * | 8/1996 | Nesbitt | 428/17 |
| 5,571,276 A | | 11/1996 | Kobos et al. | |
| 5,603,557 A | | 2/1997 | Marks et al. | |
| 5,799,423 A | | 9/1998 | Malino | |
| 5,806,942 A | | 9/1998 | Jenkins, Jr. et al. | |
| 5,924,213 A | * | 7/1999 | Lee | 33/494 |
| 5,930,927 A | * | 8/1999 | Griffin et al. | 40/621 |
| 5,950,319 A | * | 9/1999 | Harris | 33/494 |
| 6,010,338 A | * | 1/2000 | Watson | 434/81 |
| 6,053,585 A | | 4/2000 | Osen | |
| 6,065,253 A | * | 5/2000 | Ojeda | 52/79.9 |
| 6,086,174 A | | 7/2000 | Graves et al. | |
| 6,115,926 A | * | 9/2000 | Robell | 33/1 B |
| 6,150,609 A | | 11/2000 | Baldwin | |
| 6,273,660 B1 | * | 8/2001 | Ozgen et al. | 412/1 |
| 6,436,520 B1 | * | 8/2002 | Yamamoto | 428/220 |

* cited by examiner

*Primary Examiner*—Kurt Fernstrom
(74) *Attorney, Agent, or Firm*—Guy V. Manning

(57) ABSTRACT

This invention relates to a system and method for changing the appearance of an appliance. The system and method provide a magnetic sheet having a decorative pattern on one side thereof with a magnetic area or surface on an opposite side thereof. When the magnetic sheet is applied to cover the appliance, the decorative pattern decorates the appliance. A grid sheet is also provided for measuring and cutting the magnetic sheet to size.

62 Claims, 5 Drawing Sheets

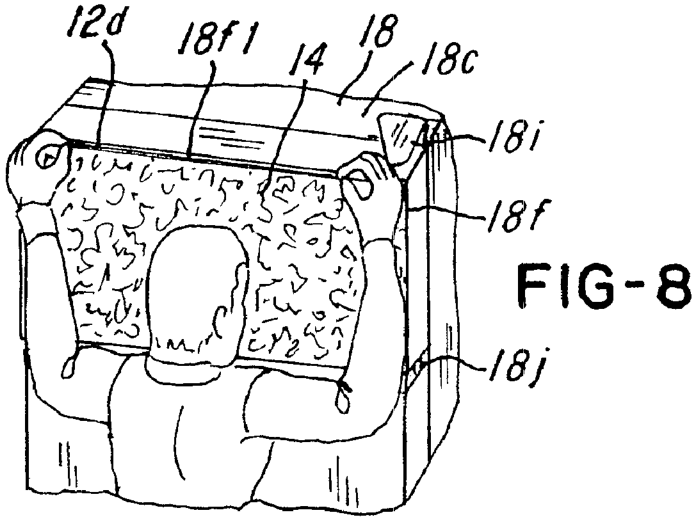
FIG-8
FIG-9
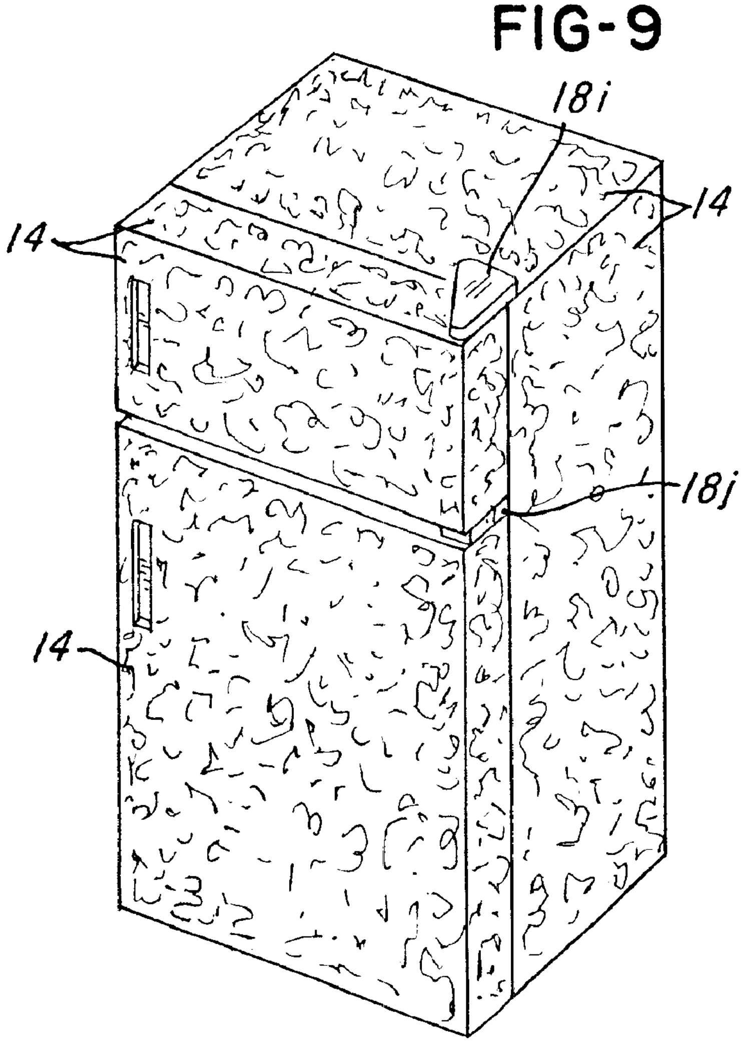

DECORATIVE MAGNETIC SHEET AND METHOD FOR DECORATING AN APPLIANCE

BACKGROUND OF THE INVENTION

1. Field of the Invention

This invention relates to appliances and, more particularly, to a removable, decorative, magnetic sheet for quickly and easily, removably attaching to an appliance in order to change the decorative appearance of the appliance.

2. Description of the Related Art

After an appliance has been used for many years, it can have an appearance that is worn or that simply does not aesthetically fit the area in which the appliance is located. For example, kitchen areas are often remodeled, and the appliances in the remodeled kitchen may not match the decorative decor of the kitchen. This forces the owner of the kitchen to purchase all new appliances if he wants the appliances to match the decor, even though the appliances being replaced may be in good working order.

In the past, techniques were used to change the appearance of the appliance. For example, a user would sometimes paint the appliance, which necessitated applying a coat of paint directly to the appliance. This approach had various drawbacks, including its inability to cover up deep nicks, scratches and dents in the surface of the appliance.

Another drawback with the painting techniques of the past is that the paint applied to the appliance was permanent.

Another drawback of the past was that a decorative pattern, such as a floral pattern, picture of a favorite scene, or other artistic impression could not easily be applied to the appliance without significant expense.

What is needed, therefore, is a simple and nonpermanent system and method for changing the decorative appearance of an appliance.

SUMMARY OF THE INVENTION

It is, therefore, a primary object of the invention to provide a system and method for selectively changing the decorative appearance of an appliance.

Another object of the invention is to provide a removable magnetic sheet having a decorative pattern that decorates the exterior appearance of the appliance when the magnetic sheet is applied thereto.

Another object of the invention is to provide a system and method for measuring and cutting a magnetic sheet having a decorative pattern thereon and for applying the decorative pattern to the appliance.

Still another object of the invention is to provide a system and method for nonpermanently changing the decorative appearance of an appliance.

In one aspect, this invention comprises a magnetic sheet for use on an appliance comprising a sheet magnet at least one decorative pattern on a first side of the sheet magnet the sheet magnet having a second side comprising a magnetic surface for adhering to the appliance, the sheet magnet covering at least one surface of the appliance so that the at least one surface is covered by the decoration to change the appearance of the appliance.

In another aspect, this invention comprises a system for changing the appearance of an appliance, comprising a magnetic sheet having at least one decorative pattern on a first side thereof and a grid pattern for cutting the magnetic sheet to a size to cover at least one entire surface of the appliance, the magnetic sheet having a second side for adhering to the appliance; the magnetic sheet covering at least one surface of the appliance so that the at least one surface becomes completely decorated by the decoration.

In still another aspect, this invention comprises a method for changing the appearance of an appliance, comprising the steps of providing a magnetic sheet having a decorative pattern on a first side thereof and a magnet on a second side thereof so that the magnetic sheet may be applied to at least one external surface of the appliance to cover in order to change the decorative appearance of the external surface.

In yet another aspect, this invention comprises a method for decorating an appliance having an exterior surface, the method comprising the steps of selecting the exterior surface of the appliance to decorate with a decorative pattern situating a first side of a magnetic sheet onto the exterior surface to cover the entirety of the exterior surface, and the magnetic sheet comprising a second side having the decorative pattern thereon.

In another aspect, this invention comprises an appliance having a removable decoration comprising an appliance, a sheet magnet, at least one decorative pattern on a first side of the sheet magnet, the sheet magnet having a second side comprising a magnetic surface for adhering to the appliance, the sheet magnet covering at least one surface of the appliance so that the at least one surface is covered by the decoration to change the appearance of the appliance.

Other objects and advantages of the invention will be apparent from the following description, the accompanying drawings and the appended claims.

DESCRIPTION OF THE DRAWINGS

FIG. 8 is an illustration showing the user applying the magnetic sheet to the appliance so that the decorative appearance is visible;

FIG. 9 is a view of the appliance with the magnetic sheet applied to the exterior surfaces of the appliance to change the decorative pattern of the appliance;

DETAILED DESCRIPTION OF THE PREFERRED EMBODIMENT

Figure 1:
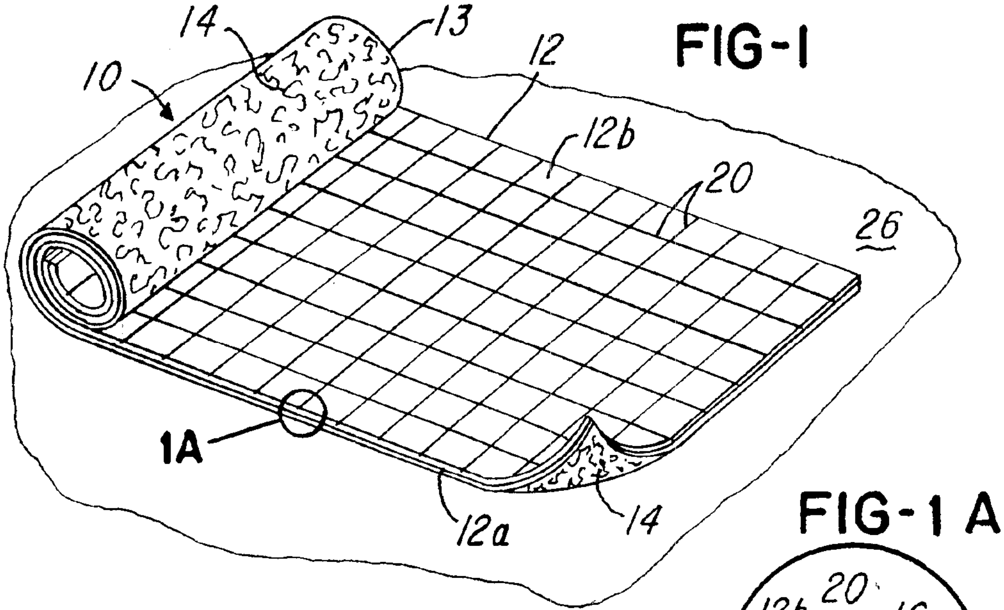
FIG. 1 is a view illustrating a partially unrolled roll of decorative magnetic material in accordance with one embodiment of the invention.
Figure 1A:
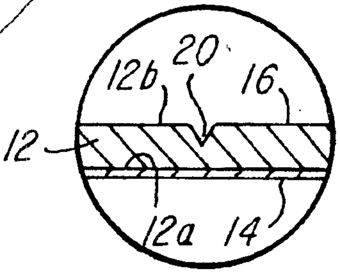
FIG. 1A is an exploded view of a portion of the magnetic sheet in FIG. 1, illustrating at least on line of weakness for facilitating applying the magnetic material to an appliance.
Figure 2:
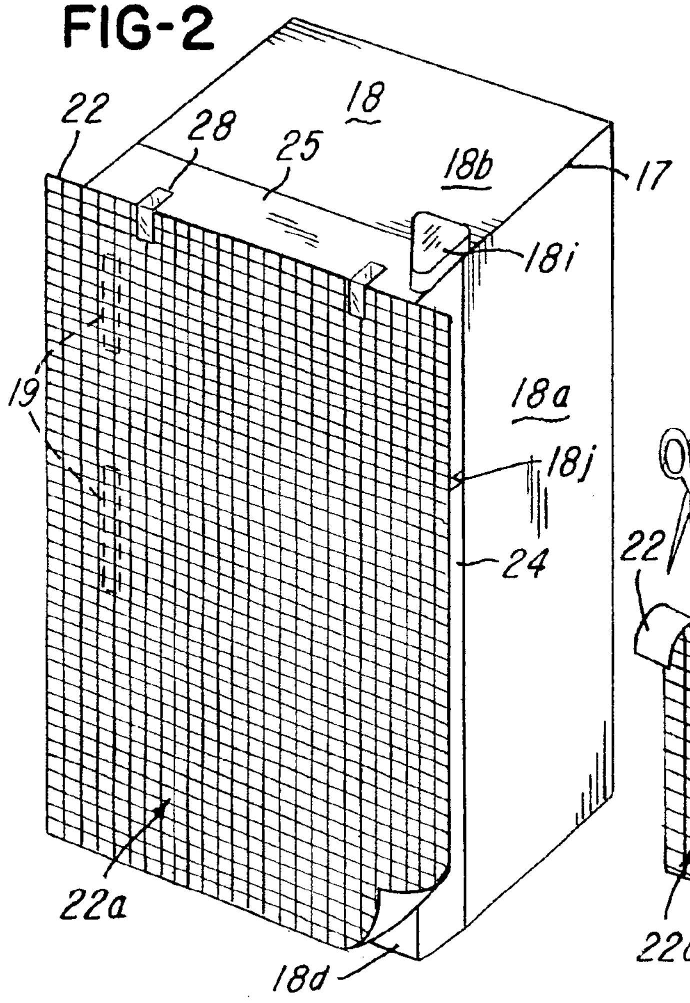
FIG. 2 is a view illustrating a grid sheet in accordance with one embodiment of the invention.

Referring now to FIG. 1, a system 10 is shown comprising a magnetic sheet 12 having at least one decorative pattern 14 situated on a first side 12*a* of the sheet 12. A second side 12*b* of the sheet 12 defines a magnetic surface 16 for adhering to an appliance 18 such as a refrigerator 18 (FIG. 2) used in a kitchen (not shown). In the embodiment being described, the surface 16 may comprise a plurality of scorings or lines of weakness 20 (FIGS. 1 and 1A), which may be provided on the surface 16 in a plurality of directions so as to make the magnetic sheet 12 easier to fold over a corner or edge, such as the edge 17 between surfaces 18*a* and 18*b* in FIG. 2.

Referring back to FIG. 1, notice that the decorative pattern 14 may comprise any suitable pattern that is desired to decorate the appliance 18. In the embodiment being described, the surface 16 is elastomeric and the pattern 14 may be adhered to the side 12*a* of the magnetic sheet 12 by such techniques as silk screening, painting or other techniques well known to those skilled in the art. Alternatively, a vinyl sheet (not shown) or alternative print sensitive film (not shown) can be laminated to the flexible magnetic elastomeric sheet 12 to define a laminated sheet and facilitate printing, silk screening or other application of the desired decorative design 14. The decorative pattern 14 can be applied to the magnetic sheet 12 or to the vinyl overlay in a continuous process by paint or silk screen rollers or a preprinted vinyl sheet can be laminated on the underlying magnetic surface 12*a* in a continuous process by pressure roller or rollers, further according to the knowledge of those skilled in the art. Alternatively, the surface 12*a* of the magnetic sheet 12 may also comprise a paintable or markable surface so that a person can create his own design or to provide a surface for written messages, educational children's games or prints, for example. Moreover, the decorative design 14 may be any suitable pattern such as a floral pattern, picture, pictorial pattern or even a solid pattern, such as a stainless steel-looking pattern, wood-grain (FIG. 10), continuous color, or multiple colors or the like.

The system 10 is further provided with a grid sheet 22 (FIGS. 2–6). In the embodiment being described, the grid sheet 22 provides a grid pattern for measuring and cutting the magnetic sheet 12 to a size that will cover at least one surface of the appliance 18. As best illustrated in FIGS. 2–6, the grid sheet 22 has a grid pattern 22*a* (FIG. 2) for facilitating measuring and cutting the magnetic sheet 12 to a size to cover at least one entire surface, such as surface 18*a* in FIG. 2 or 18*d* in FIG. 2, which is the front surface of a refrigerator door 24 of the appliance 18.

The procedure for measuring and cutting the magnetic sheet 12 to size using the grid sheet 22 will now be described relative to FIGS. 1–9 and FIG. 11. As illustrated in FIG. 1, the magnetic sheet 12 is unrolled (block 30 in FIG. 11), so that it lies flat on a flat surface 26, such as a table (not shown) or the floor. The user places the tracing grid sheet 22 on the appliance 18 using, for example, tape 28, as described at block 32 in FIG. 11 and shown in FIGS. 2–3.

Figure 3:
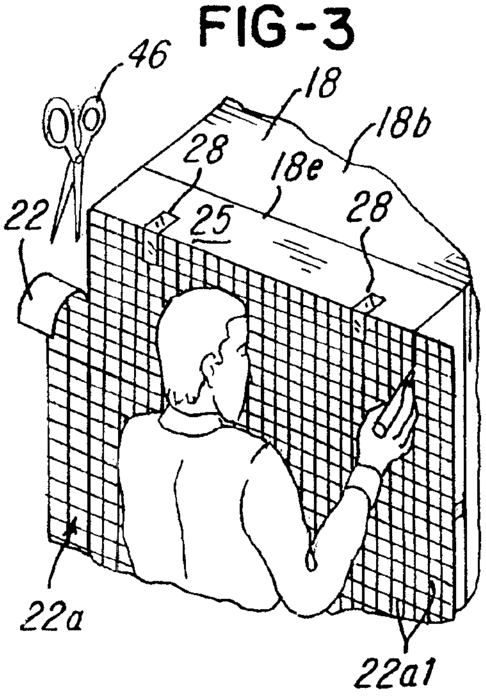
FIG. 3 is an illustration of the grid sheet shown in FIG. 2, illustrating a user measuring and cutting the grid sheet.

As illustrated in FIG. 3, the user traces the outline of the surface 18*d* onto the grid pattern 22*a* of the grid sheet 22. It should be understood that the grid pattern 22*a* may comprise a series of tracing lines 22*a*1 to facilitate the tracing of the outline of the surface 18*b* in the embodiment being described. After the user has traced the outline (block 34 in FIG. 11), the user cuts the tracing grid (block 36 in FIG. 11) using conventional scissors 46 (FIG. 3).

Figure 4:
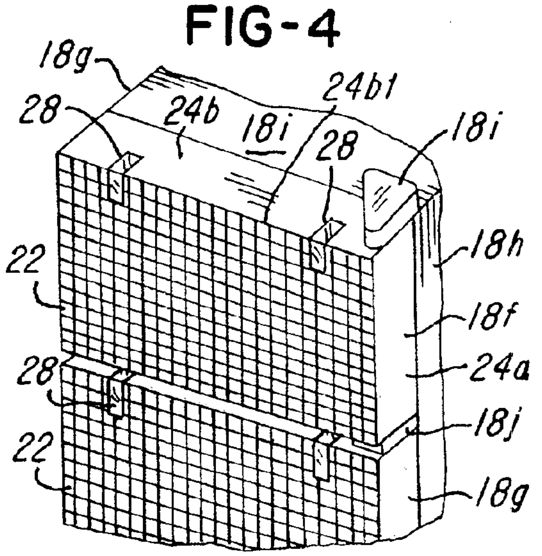
FIG. 4 is a view of the grid sheet applied to the appliance.
Figure 5:
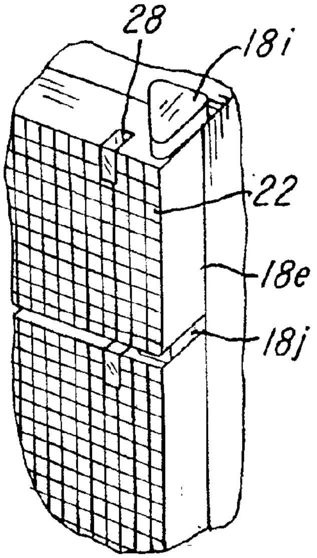
FIG. 5 is another illustration of the grid sheet showing removal of at least one hinge to facilitate using the grid sheet to measure an exterior surface of the appliance.

In the embodiment being illustrated, it has been found to be desirable to first cut the tracing grid sheet 22 to cover any doors, such as doors 24 and 25 (FIG. 2) after the grid pattern 22 is firmly taped over the doors 24 and 25. Thereafter, the hinges 18*i* and 18*j* and door handles 19 (FIGS. 4–5) may be traced around, as illustrated in FIG. 5. Although not shown, it should be appreciated that the sheet 22 may be draped over the entire doors 24 and 25. For example, edges 24*a* and 24*b* and the sheet 22 are cut to accommodate the handles 19 and hinges 18*c* and 18*j*. The sheet 22 is then folded over any corners, such as corner 22*b*1 (FIG. 4). These parts 18*i*, 18*j* and 19 may also be removed during the tracing and measuring steps if desired.

Figure 6:
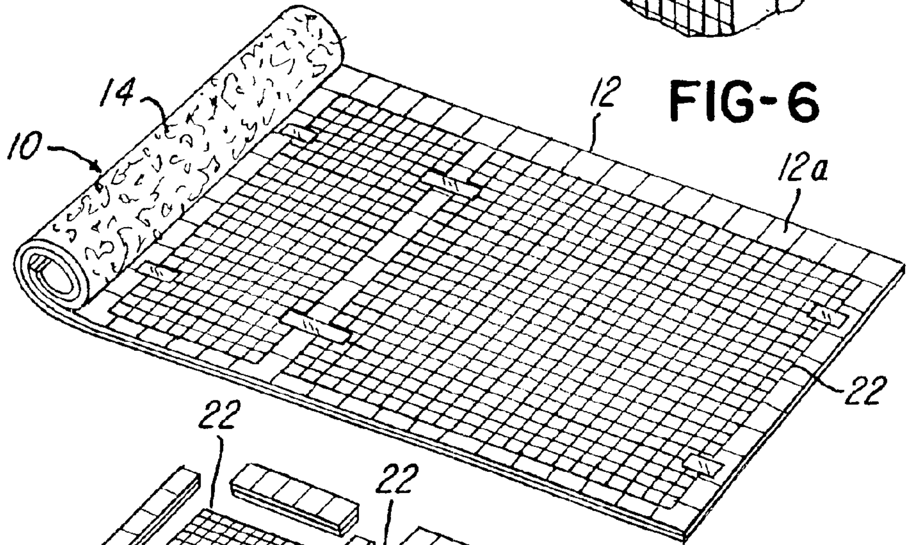
FIG. 6 is an illustration showing the grid sheet applied to the magnetic sheet.
Figure 7:
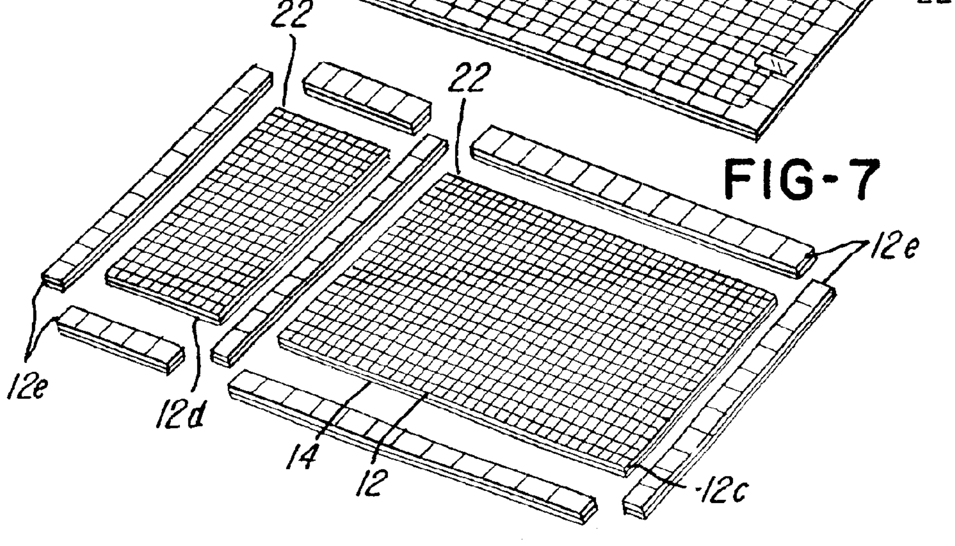
FIG. 7 is a view of the magnetic sheet and scrap after it has been cut to size using the grid sheet.
Figure 11:
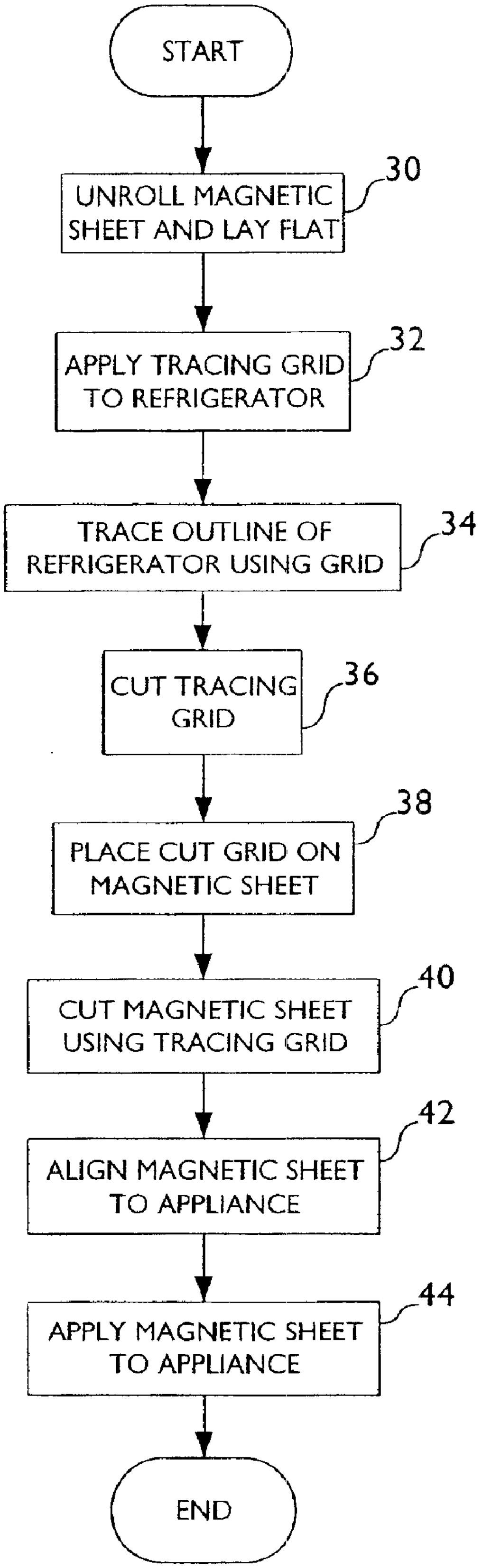
FIG. 11 is a schematic diagram of a method for decorating an appliance in accordance with one embodiment of the invention.

After the grid pattern has been traced and cut in the manner described and shown relative to FIGS. 1–5, the grid sheet 22 is then situated directly onto the unrolled magnetic sheet 12 as illustrated in FIG. 6 and described at block 38 in FIG. 11. A user then cuts (block 40 in FIG. 11) the outline of the magnetic sheet 12 using the previously cut grid sheet 22, which will leave at least one or a plurality of cut magnetic sheet sheets 12*c* and 12*d* and excess scrap 12*e* (FIG. 7).

After the magnetic sheet 12 has been cut to provide the various pieces 12*c* and 12*d*, the grid sheet 22 is removed and the pieces 12*c* and 12*d* are aligned (block 42 in FIG. 11) and applied (block 44 in FIG. 11) to the appliance 18 as illustrated in FIG. 8. Note that the decorative pattern 14 is now exposed so that the front exterior surface 18*f*1 of the freezer door 18*c* comprises the new decorative pattern 14. The process is repeated for all the visible or exterior surfaces, such as the surfaces 18*f*, 18*g*, 18*h*, 18*i*, 24*a* and 24*b* (FIG. 4) until all surfaces visible to the naked eye are covered with the decorative pattern 14, as illustrated in FIG. 9. As mentioned earlier herein, the lines of weakness 20 (FIGS. 1 and 1A) facilitate bending the magnetic sheet 12 over corners, such as the corner 18*a* in FIG. 2 and corner 24*b*1 in FIG. 4.

Advantageously, this invention provides a system and method for altering the look of an appliance, such as a refrigerator, dishwasher or even commercial machines, such as vending machines or the like. The decorative pattern 14 enables the user to select a desired pattern for decorating the appliance 18. Although the pattern 14 may be a continuous color or multiple colors, a floral pattern or the like, it could also comprise a picture, such as a picture of the user's family, favorite vacation spot, or the like. Advantageously, this system and method provide means for quickly changing the appearance of an appliance, for example, when a kitchen has been redecorated or remodeled.

Figure 10:
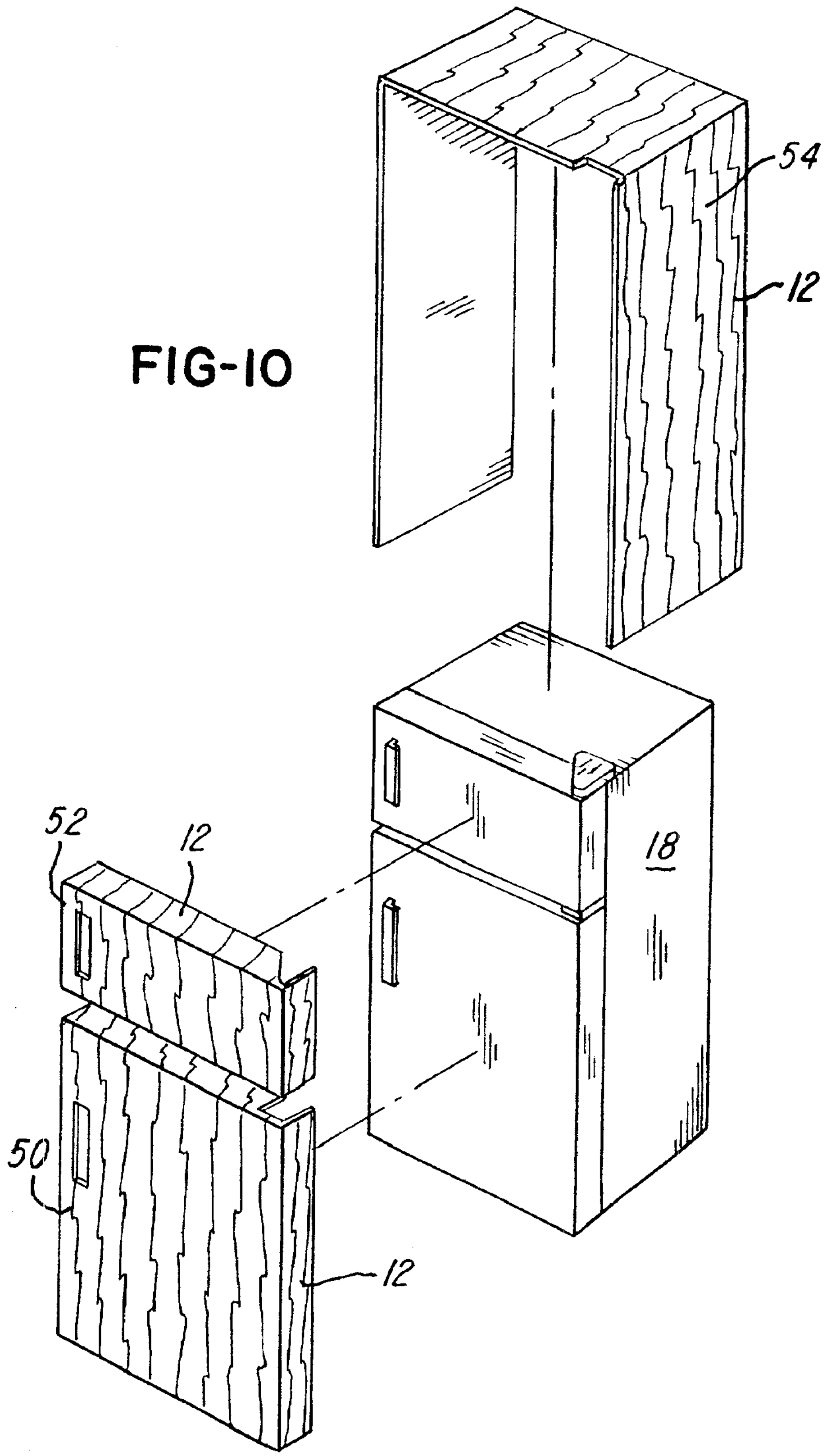
FIG. 10 is a view of another embodiment of the invention showing a plurality of magnetic components or sheets that are preformed to fit an appliance.

FIG. 10 shows another embodiment of the invention wherein a plurality of preformed magnetic sheets 50, 52 and 54 may be provided to retrofit onto the appliance. In this embodiment, the magnetic sheets 50–54 are preformed so that the user simply situates the preformed sheets 50–54 onto the appliance 18. This eliminates or reduces the need for the user to use the grid pattern or grid sheet 22 and also the need to trace and cut the magnetic sheet 12.

Although the invention has been shown in a grid sheet 22 that is separate from the magnetic sheet 12, it should be appreciated that the sheet 22 or a grid pattern 14 may be provided on a removable transparent sheet 23 (FIG. ?) which is used to trace and cut the magnetic sheet 22, but then is removed after the sheet 12 is correctly situated on the appliance 18.

In the embodiment being described, the magnetic sheet 12 is approximately 0.015 inch (0.4 mm)–0.030 inch (0.75 mm) thick and is provided in a continuous roll 13 (FIG. 1) available from Bisbell Magnetic Products Ltd. of Staffordshire, England, or Yuxiang Magnetic Materials Ind. Co., Ltd. of Xiamen, China. The magnetic sheet 12 comprises a typical width and length that is suitable for covering the entire surface, such as the surfaces 18*g*–18*i* in FIG. 4 of the appliance 18. It should be appreciated that the magnetic sheet 12 can be easily removed or exchanged with another magnetic sheet having a different decorative pattern.

While the systems and methods herein described, and the forms of apparatus for carrying these systems and methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A magnetic sheet for use on an electrical appliance having an original appearance, the magnetic sheet comprising a sheet magnet having a first side and a second side;

at least one decorative pattern on said first side;

a magnetic surface on said second side, and at least one line of weakness wherein said sheet magnet is adapted to cover at least a portion of at least one surface of the electrical appliance so that said at least a portion of at least one surface is covered by said decoration to change the appearance of the electrical appliance from said original appearance to said at least one decorative pattern.

2. The magnetic sheet as recited in claim 1 wherein said magnetic sheet comprises a fitting sheet comprising a grid pattern for measuring and cutting said sheet magnet to size.

3. The magnetic sheet as recited in claim 2 wherein said grid pattern is situated on a grid sheet.

4. The magnetic sheet as recited in claim 2 wherein said grid pattern is situated on said magnetic sheet.

5. The magnetic sheet as recited in claim 4 wherein said grid pattern is situated over said decorative pattern on said first side of said magnetic sheet.

6. The magnetic sheet as recited in claim 1 wherein said decorative pattern is applied to said first side by silk screening or painting.

7. The magnetic sheet as recited in claim 1 wherein said decorative pattern is provided on a decorative sheet that is laminated to said sheet magnet.

8. The magnetic sheet as recited in claim 1 wherein said sheet magnet is pre-sized to fit said appliance.

9. The magnetic sheet as recited in claim 1 wherein said appliance comprises a kitchen appliance.

10. The magnetic sheet as recited in claim 9 wherein said kitchen appliance is a refrigerator.

11. The magnetic sheet as recited in claim 1 wherein said decorative pattern comprises a single color.

12. The magnetic sheet as recited in claim 1 wherein said decorative pattern comprises multiple colors.

13. The magnetic sheet as recited in claim 1 wherein said electrical appliance has a plurality of surfaces that lie in different planes; and said sheet magnet has a thickness of 0.015 inch (0.4 mm)–0.030 inch (0.75 mm) to permit said sheet magnet to be folded over any intersections between said plurality of surfaces.

14. The magnetic sheet as recited in claim 13 wherein said sheet magnet has been cut into multiple pieces adapted to cover each of said plurality of surfaces.

15. A system for changing the appearance of an electrical appliance having an original appearance comprising:

a magnetic sheet having at least one decorative pattern on a first side thereof; and a grid pattern on at least one side of the magnetic sheet for cutting said magnetic sheet to a size to cover at least one surface of said electrical appliance grid pattern;

said magnetic sheet having a second side for adhering to said appliance said magnetic sheet covering at least one surface of the electrical appliance so that said appearance of said at least one surface becomes changed from said original appearance to said at least one decorative pattern.

16. The system as recited in claim 15 wherein said system comprises a grid sheet that is separate from said magnetic sheet.

17. The system as recited in claim 16 wherein said grid pattern is situated on said magnetic sheet.

18. The system as recited in claim 17 wherein said grid pattern is situated on a grid sheet situated over said decorative pattern on said first side of said magnetic sheet.

19. The system as recited in claim 15 wherein said decorative pattern is applied to said first side by silk screening or painting.

20. The system as recited in claim 15 wherein said decorative pattern is provided on a decorative sheet that is laminated to said first side of said magnetic sheet.

21. The system as recited in claim 15 wherein said magnetic sheet is pre-configured to fit said electrical appliance.

22. The system as recited in claim 15 wherein said electrical appliance is a kitchen appliance.

23. The system as recited in claim 22 wherein said kitchen appliance is a refrigerator.

24. The system as recited in claim 15 wherein said decorative pattern comprises a single color.

25. The system as recited in claim 15 wherein said decorative pattern comprises multiple colors.

26. The system as recited in claim 15 wherein said electrical appliance comprises a plurality of surfaces that lie in different planes; and said magnetic sheet has a thickness of 0.015 inch (0.4 mm)–0.030 inch (0.75 mm) to permit said magnetic sheet to be folded over any intersections between said plurality of surfaces.

27. The system as recited in claim 15 wherein said magnetic sheet comprises at least one line of weakness.

28. The system as recited in claim 15 wherein said appliance comprises a plurality of external surfaces, and said magnetic sheet has been cut according to said grid pattern into multiple pieces so that a plurality of said multiple pieces covers each of said plurality of external surfaces that is visible to the naked eye.

29. The system as recited in claim 16 wherein said magnetic sheet has been cut according to said grid pattern into multiple pieces so that a plurality of said multiple pieces covers all exterior surfaces of said refrigerator that are visible to the naked eye when said refrigerator is situated in said kitchen.

30. A method for changing the appearance of an appliance having a plurality of external surfaces, the method comprising the steps of:

providing a magnetic sheet having
a decorative pattern on a first side thereof and
a magnet on a second side thereof; and
providing a grid pattern; then
situating the grid pattern on at least one of said external surfaces; then
cutting said magnetic sheet for said at least one of said external surface according to said grid pattern; then
applying said magnetic sheet to said at least one of said external surfaces so that said decorative pattern is visible.

31. The method as recited in claim 30 wherein
said grid pattern is situated on a grid sheet that is separate from said magnetic sheet.

32. The method as recited in claim 30 wherein
said grid pattern is situated on said magnetic sheet.

33. The method as recited in claim 31 and further comprising the step of:
situating the grid sheet over said decorative pattern on said first side of said magnetic sheet.

34. The method as recited in claim 30 wherein said method further comprises the step of:
applying said decorative pattern to said first side by silk screening or painting.

35. The method as recited in claim 30 wherein said method further comprises the steps of:
providing said decorative pattern on a decorative sheet;
laminating said decorative sheet to said first side of said magnetic sheet.

36. The method as recited in claim 30 wherein said method further comprises the step of:
pre-forming said magnetic sheet to fit said appliance.

37. The method as recited in claim 36 wherein
said appliance is a refrigerator.

38. The method as recited in claim 30 wherein said method further comprises the step of:
providing a magnetic sheet comprising a decorative pattern comprising a continuous color.

39. The method as recited in claim 30 wherein
the decorative pattern comprises multiple colors.

40. The method as recited in claim 39 wherein
said decorative pattern comprises a floral pattern, picture or solid pattern.

41. The method as recited in claim 30 wherein
said electrical appliance has a plurality of surfaces that lie in different planes, and
the magnetic sheet has a thickness of 0.015 inch (0.4 mm)–0.030 inch (0.75 mm) to permit said magnetic sheet to be folded over any intersections between said plurality of surfaces.

42. The method as recited in claim 30 wherein
the magnetic sheet has at least one line of weakness.

43. The method as recited in claim 30 wherein
said magnetic sheet is cut into multiple pieces adapted to cover a plurality of external surfaces that are visible to the naked eye.

44. The method as recited in claim 41 wherein said method further comprises the step of:
cutting the magnetic sheet into multiple pieces adapted to cover all exterior surfaces of said refrigerator that are visible to the naked eye.

45. A method for decorating an electrical appliance having an exterior surface, said method comprising the steps of:
selecting a magnetic sheet having a first side and a second side, the second side bearing a decorative pattern; then
situating a grid on said exterior surface; then
creating a tracing of said exterior surface on said grid; then
situating the first side of said magnetic sheet onto said exterior surface according to said tracing.

46. The method for decorating as recited in claim 45 wherein said method further comprises the step of:
situating said grid on said magnetic sheet; and
cutting said magnetic sheet using said tracing.

47. The method for decorating as recited in claim 45 wherein said method further comprises the step of:
laying said magnetic sheet on a flat surface until said magnetic sheet lies in a first plane that is generally planar.

48. The method for decorating as recited in claim 45 wherein
said grid is situated on a grid sheet, and
said method further comprises the steps of
transferring the tracing on said grid sheet onto said magnetic sheet; and
cutting said magnetic sheet after said transferring step.

49. An electrical appliance having a removable decoration comprising:
an electrical appliance;
a sheet magnet having
a first side and a second side; and
at least one decorative pattern on said first side;
a magnetic surface on said second side; and
a fitting sheet having a grid pattern
wherein said sheet magnet may be cut to size according to said grid pattern to adapt said sheet magnet to cover at least one surface of the electrical appliance with said decoration to change the appearance of the electrical appliance.

50. The electrical appliance as recited in claim 49 wherein
said grid pattern is situated on a grid sheet.

51. The electrical appliance as recited in claim 49 wherein
said grid pattern is situated on said magnetic sheet.

52. The electrical appliance as recited in claim 51 wherein
said grid pattern is situated over said decorative pattern on said first side of said magnetic sheet.

53. The electrical appliance as recited in claim 49 wherein
said decorative pattern is applied to said first side by silk screening or painting.

54. The electrical appliance as recited in claim 49 wherein
said decorative pattern is provided on a decorative sheet that is laminated to said sheet magnet.

55. The electrical appliance as recited in claim 49 wherein
said sheet magnet is pre-sized to fit said appliance.

56. The electrical appliance as recited in claim 49 wherein
said appliance comprises a kitchen appliance.

57. The electrical appliance as recited in claim 56 wherein
said kitchen appliance is a refrigerator.

58. The electrical appliance as recited in claim 49 wherein
said decorative pattern comprises a single color.

59. The electrical appliance as recited in claim 49 wherein
said decorative pattern comprises multiple colors.

60. The electrical appliance as recited in claim 49 wherein
said electrical appliance comprises a plurality of surfaces that lie in different planes; and
said sheet magnet has a thickness of 0.015 inch (0.4 mm)–0.030 inch (0.75 mm) to permit said sheet magnet to be folded over any intersections between said plurality of surfaces.

61. The electrical appliance as recited in claim 60 wherein said sheet magnet comprises at least one line of weakness.

62. The electrical appliance as recited in claim 60 wherein said sheet magnet has been cut into multiple pieces adapted to cover each of said plurality of surfaces.

* * * * *